(12) United States Patent
Sugibayashi (10) Patent No.: US 8,127,607 B2
(45) Date of Patent: Mar. 6, 2012

(54) ANGULAR VELOCITY SENSOR INTERFACE CIRCUIT AND ANGULAR VELOCITY DETECTION APPARATUS

(75) Inventor: Hideaki Sugibayashi, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/256,572

(22) Filed: Oct. 23, 2008

(65) Prior Publication Data

US 2009/0031807 A1 Feb. 5, 2009

Related U.S. Application Data (63) Continuation of application No. PCT/JP2007/052959, filed on Feb. 19, 2007.

(30) Foreign Application Priority Data

Apr. 26, 2006 (JP) ................................. 2006-122282

(51) Int. Cl.
*G01P 9/04* (2006.01)
*G01C 19/56* (2006.01)
(52) U.S. Cl. .................................................. 73/504.12
(58) Field of Classification Search ............... 73/504.12, 73/504.14, 504.16, 504.04, 504.02
See application file for complete search history.

(56) References Cited

U.S. PATENT DOCUMENTS

| 6,732,586 | B2 * | 5/2004 | Nozoe et al. ............... 73/504.12 |
| 7,188,522 | B2 * | 3/2007 | Betz et al. .................. 73/504.12 |
| 7,322,237 | B2 * | 1/2008 | Kutsuna ..................... 73/504.12 |
| 7,370,531 | B2 * | 5/2008 | Yokoi et al. ................ 73/504.12 |
| 2007/0144256 | A1 | 6/2007 | Mori et al. |

FOREIGN PATENT DOCUMENTS

| JP | 05-207356 A | 8/1993 |
| JP | 05-094709 U | 12/1993 |
| JP | 09-297028 A | 11/1997 |
| JP | 2004-347505 A | 12/2004 |
| JP | 2005-214948 A | 8/2005 |
| WO | 2006/028186 A1 | 3/2006 |

OTHER PUBLICATIONS

Official Communication issued in International Patent Application No. PCT/JP2007/052959, mailed on May 29, 2007.
Official Communication issued in corresponding Japanese Patent Application No. 2007-540851, mailed on Feb. 15, 2011.

* cited by examiner

*Primary Examiner* — Helen C. Kwok
(74) *Attorney, Agent, or Firm* — Keating & Bennett, LLP

(57) ABSTRACT

An angular velocity detection apparatus includes an angular velocity detection signal amplifier circuit which amplifies an angular velocity detection signal Vo output from an angular velocity sensor, and an offset control circuit which controls an offset so as to be a reference voltage which is output when a value of an angular velocity is 0. The angular velocity detection apparatus further includes an input switch circuit which selects the reference voltage and a discharge switch circuit which short-circuits a capacitor included in a high-pass filter in an offset control period.

6 Claims, 9 Drawing Sheets

ANGULAR VELOCITY SENSOR INTERFACE CIRCUIT AND ANGULAR VELOCITY DETECTION APPARATUS

BACKGROUND OF THE INVENTION

1. Field of the Invention

The present invention relates to an angular velocity sensor interface circuit and an angular velocity detection apparatus used to compensate for camera shake.

2. Description of the Related Art

In general, a digital still camera and a digital video camera include angular velocity sensors to detect and compensate for camera shake.

Such an angular velocity sensor used to compensate for camera shake includes a piezoelectric vibrator. A voltage is generated by vibration of the piezoelectric vibrator caused by a Coriolis force and outputs a voltage signal generated in accordance with an angular velocity. Note that the voltage signal output from the angular velocity sensor is amplified and converted into a voltage signal generated in accordance with an angular velocity in a control operation corresponding to an angular velocity, such as camera shake compensation, using an output signal of the angular velocity sensor. A DC amplifier circuit is provided to amplify the voltage signal output from the angular velocity sensor and inevitably generates a direct-current offset due to variations in circuit constants. Furthermore, angular velocity changes in frequencies below a predetermined frequency are not caused by camera shake, but rather, are caused when a user intentionally performs specific camera operations, such a spanning and tilting. Therefore, such frequencies below the predetermined frequency should be ignored when detecting camera shake. As disclosed in Japanese Unexamined Patent Application Publication No. 5-207356, a DC component and a low-frequency component of a signal output from an angular velocity sensor are removed using a high-pass filter and then the output signal is subjected to a DC amplifying processing.

An angular velocity sensor interface circuit disclosed in Japanese Unexamined Patent Application Publication No. 5-207356 will now be described with reference to FIG. 1.

Figure 1:
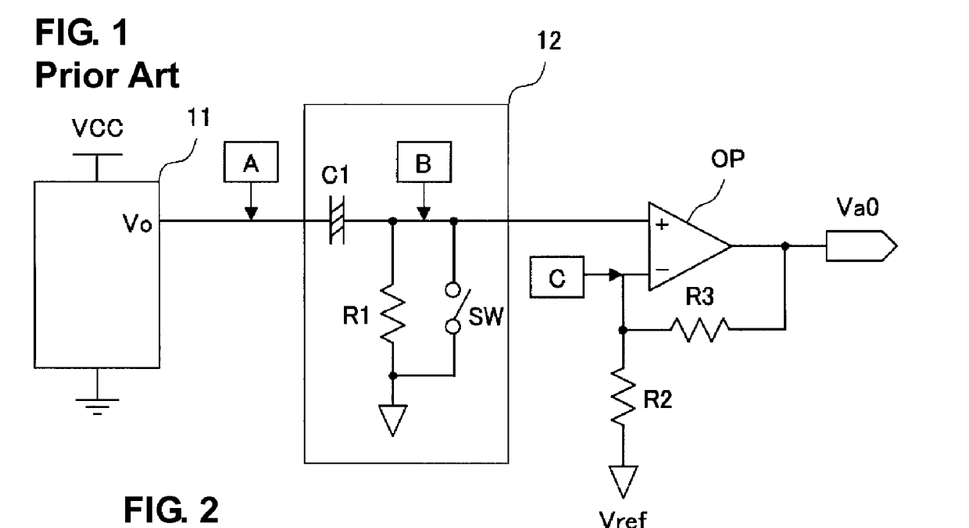
FIG. 1 is a diagram illustrating a configuration of an angular velocity sensor interface circuit according to the related art.

In FIG. 1, the angular velocity sensor interface circuit includes a high-pass filter 12 and a DC amplifier circuit. An angular velocity sensor 11 receives a power supply voltage VCC and outputs an angular velocity detection signal Vo generated in accordance with an angular velocity. The high-pass filter 12 includes a capacitor C1 and a resistor R1. The DC amplifier circuit includes resistors R2 and R3 and an operational amplifier OP.

The high-pass filter 12 further includes a switch SW which causes a short circuit at both terminals of the resistor R1. The switch SW is turned on when the angular velocity sensor 11 and the angular velocity sensor interface circuit are activated and causes a short circuit at both terminals of the resistor R1. With this configuration, a time constant of the capacitor C1 included in the high-pass filter 12 at the charge time is minimal and the capacitor C1 is charged at high speed up to a steady-state voltage so that a signal output from the angular velocity sensor interface circuit can be immediately utilized.

The capacitor C1 included in the high-pass filter 12 shown in FIG. 1 has a relatively large capacitance, such as several tens of μF. Even when the resistor R1 is short-circuited using the switch SW shown in FIG. 1, it takes a few seconds to charge the capacitor C1 up to the steady-state voltage. Accordingly, even if the angular velocity detection apparatus is provided to compensate for camera shake, for example, the camera shake compensation cannot be performed simultaneously upon power-on of a camera.

Figure 2:
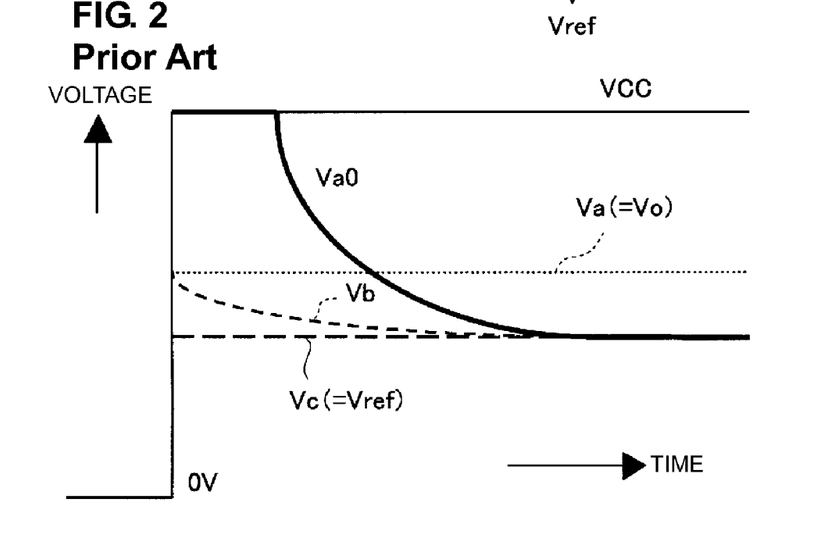
FIG. 2 is a diagram illustrating a waveform of various sections of the angular velocity sensor interface circuit shown in FIG. 1 at an activation time.

FIG. 2 is a diagram showing waveforms output from various sections of the angular velocity sensor interface circuit shown in FIG. 1. When a voltage Va at a point A, which is the angular velocity detection signal Vo obtained by applying the power supply voltage VCC, is greater than a reference voltage Vref, that is, when the voltage Va has a positive offset, an output voltage VaO of the operational amplifier OP is first clamped by the power supply voltage VCC, then decreases as a voltage Vb at a point B decreases, and eventually is restored to the reference voltage Vref.

Since a digital video camera in the related art requires a waiting time including a time for loading a tape and a required time due to various resource constraints during a time immediately after the digital video camera is powered on and before shooting, even when a response speed of an angular velocity detection apparatus is relatively slow, this does not cause a problem. However, in recent years, digital still cameras and DVD video cameras capable of shooting immediately after being powered on, that is, digital still cameras and DVD video cameras having high-speed responses, have been required.

SUMMARY OF THE INVENTION

To overcome the problems described above, preferred embodiments of the present invention provide an angular velocity sensor interface circuit and an angular velocity detection apparatus which have reduced activation times, that is, a time after power on and before a voltage generated in accordance with an angular velocity is properly output.

According to a preferred embodiment of the present invention, an angular velocity sensor interface circuit includes a piezoelectric vibrator and a circuit which drives the piezoelectric vibrator and which detects a voltage generated by vibration of the piezoelectric vibrator, and which outputs an angular velocity detection signal which is a voltage signal generated in accordance with an applied angular velocity to an angular velocity signal processing circuit. The angular velocity sensor interface circuit includes an angular velocity detection signal amplifier circuit arranged to amplify the angular velocity detection signal, an offset control circuit arranged to control an offset of the angular velocity detection signal amplifier circuit so that an output voltage of the angular velocity detection signal amplifier circuit is substantially equal to a reference voltage which is substantially equal to an output voltage when a value of the applied angular velocity is about 0 in an offset control period after the angular velocity sensor interface circuit is activated, and an input switch circuit arranged to supply the reference voltage to the angular velocity signal processing circuit in the offset control period and to supply a signal output from the angular velocity detection signal amplifier circuit to the angular velocity signal processing circuit after the offset control period is terminated.

Preferably, the angular velocity sensor interface circuit may further include a high-pass filter which is arranged in an input section of the angular velocity signal processing circuit and which includes a capacitor connected to an output terminal of the angular velocity detection signal amplifier circuit in series and a shunt resistor connected between the capacitor and a line of the reference voltage.

Preferably, the angular velocity sensor interface circuit may further include a discharge switch circuit arranged to cause a short circuit at both terminals of the capacitor in the offset control period and to release the both terminals after the offset control period is terminated.

Preferably, the angular velocity signal processing circuit may include an amplifier circuit which amplifies a voltage output from the angular velocity detection signal amplifier circuit and a filter which attenuates a signal component in an unnecessary frequency band, and may output a voltage signal generated in accordance with the applied angular velocity. The angular velocity sensor interface circuit may include two angular velocity signal processing circuits and an AD converter arranged to perform AD conversion on voltage signals output from the two angular velocity signal processing circuits in a time division manner and to externally output the converted signals.

According to another preferred embodiment of the present invention, an angular velocity detection apparatus includes the angular velocity sensor interface circuit described above and an angular velocity sensor.

According to a further preferred embodiment of the present invention, an angular velocity detection apparatus includes an angular velocity sensor interface circuit described above, and first and second angular velocity sensors which are arranged so that a rotation axis of an angular velocity to be detected using the first angular velocity sensor is substantially perpendicular to a rotation axis of an angular velocity to be detected using the second angular velocity sensor, and which supply angular velocity detection signals to the two corresponding angular velocity signal processing circuits.

Preferably, the offset control circuit controls an offset such that a voltage output from the angular velocity detection signal amplifier circuit to which an output voltage of the angular velocity sensor is supplied is equal to a reference voltage. The input switch circuit supplies the reference voltage to the angular velocity signal processing circuit in the offset control period and a signal output from the angular velocity sensor is supplied through the angular velocity detection signal amplifier circuit to the angular velocity signal processing circuit after the offset control period is terminated. The offset control circuit is merely used to control an offset by setting a reference voltage, for example, of a DC amplifier circuit used to amplify the signal output from the angular velocity sensor to a predetermined value, and therefore, the offset control circuit is not related to a time constant at a time of charging/discharging. Therefore, an activation time can be significantly reduced as compared to an activation time utilized the related art in which a time constant of a capacitor included in a high-pass filter at a time of charging is reduced.

Since the high-pass filter including the capacitor connected to an output terminal of the angular velocity detection signal amplifier circuit in series is arranged in the input section of the angular velocity signal processing circuit which processes the angular velocity detection signal which is a signal output from the angular velocity sensor, the discharge switch circuit causes a short circuit at the both terminals of the capacitor in the offset control period, and both terminals of the capacitor are released after the offset control period is terminated, the angular velocity signal processing circuit can perform signal processing, such as amplifying processing, on a signal supplied through the high-pass filter.

As described above, even when a high-pass filter which is a time constant circuit including a capacitor connected to an output terminal of the angular velocity detection signal amplifier circuit in series, a time constant of the capacitor at a time of charging/discharging does not need to be changed to be temporarily small. Accordingly, a waiting time required to charge the capacitor up to a steady-state voltage is eliminated, and a long activation time is not necessary.

Since the discharge switch circuit causes a short circuit at both terminals of the capacitor included in the high-pass filter in the offset control period, even when the capacitor has been charged, the capacitor is discharged in the offset control period and the high-pass filter properly immediately operates in accordance with an input signal after the offset control terminal is terminated.

The two angular velocity signal processing circuits which output voltage signals in accordance with an applied angular velocity and the AD converter which performs AD conversion of voltage signals output from the two angular velocity signal processing circuits in a time division manner are provided. Accordingly, two angular velocity sensors can be provided without increasing the circuit size.

Since rotation axes of angular velocities of the two angular velocity sensors substantially perpendicularly intersect each other, the angular velocity sensors provide compact angular velocity detection apparatuses which perform camera shake compensation in pitching and yawing directions.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 3:
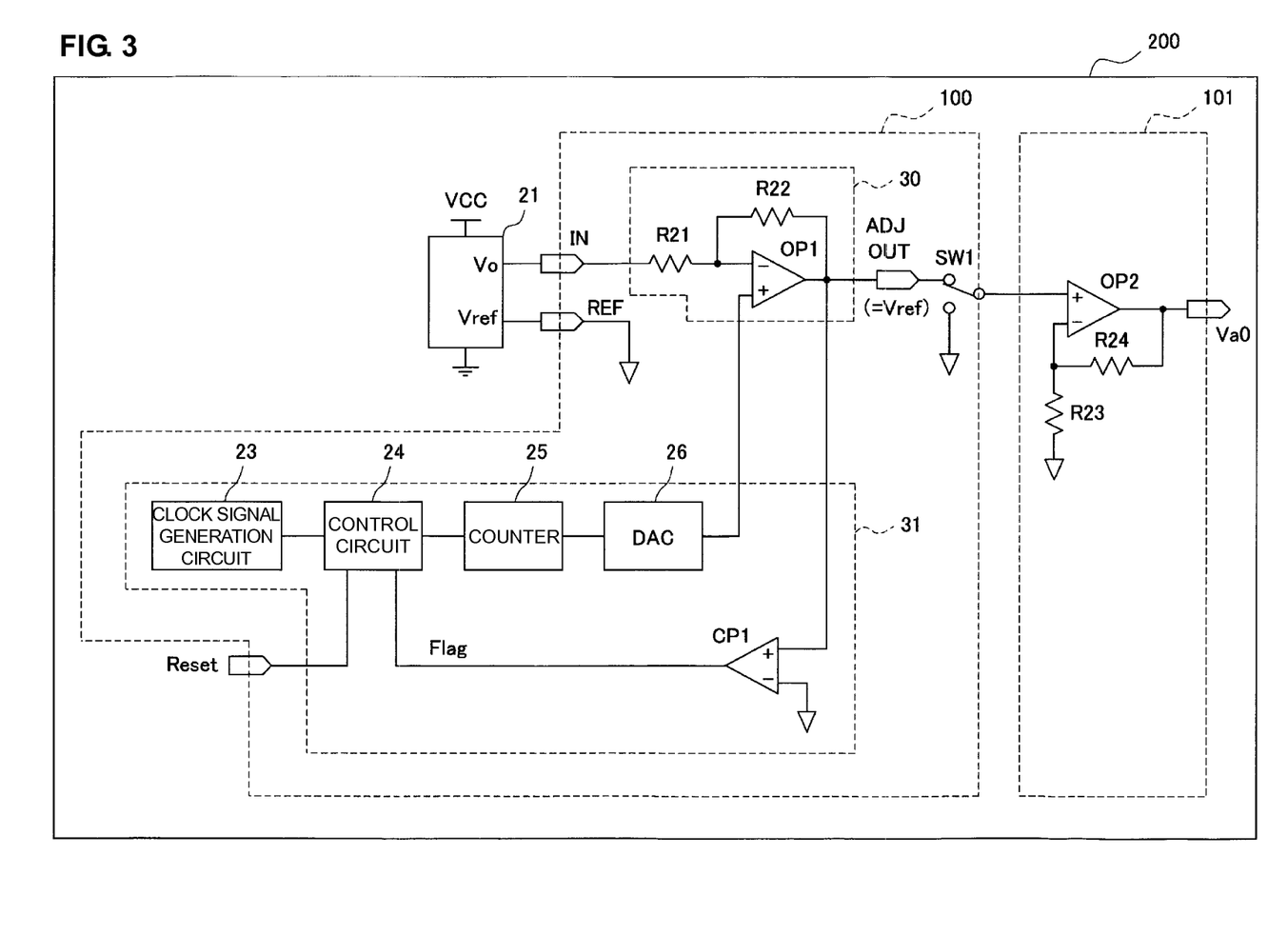
FIG. 3 is a block diagram illustrating a configuration of an angular velocity sensor interface circuit and an angular velocity detection apparatus according to a first preferred embodiment of the present invention.

FIG. 3 is a diagram illustrating a configuration of an angular velocity sensor interface circuit and an angular velocity detection apparatus according to a first preferred embodiment of the present invention.

In FIG. 3, an angular velocity detection apparatus 200 includes an angular velocity sensor 21, an angular velocity sensor interface circuit 100, and an angular velocity signal processing circuit 101.

The angular velocity sensor 21 includes a piezoelectric vibrator and a circuit which drives the piezoelectric vibrator and which detects a voltage generated by vibration of the piezoelectric vibrator. The angular velocity sensor 21 outputs a reference voltage Vref and an angular velocity detection signal Vo which is a voltage signal generated in accordance with an applied angular velocity.

The angular velocity sensor interface circuit 100 performs direct-current amplifying processing of the angular velocity detection signal Vo output from the angular velocity sensor 21 and used to control an offset of the angular velocity detection signal Vo subjected to the direct-current amplifying processing. The angular velocity sensor interface circuit 100 includes an angular velocity detection signal amplifier circuit 30 and an offset control circuit 31.

The angular velocity signal processing circuit 101 includes an amplifier circuit which amplifies the angular velocity detection signal Vo output from the angular velocity sensor interface circuit 100.

Figure 4:
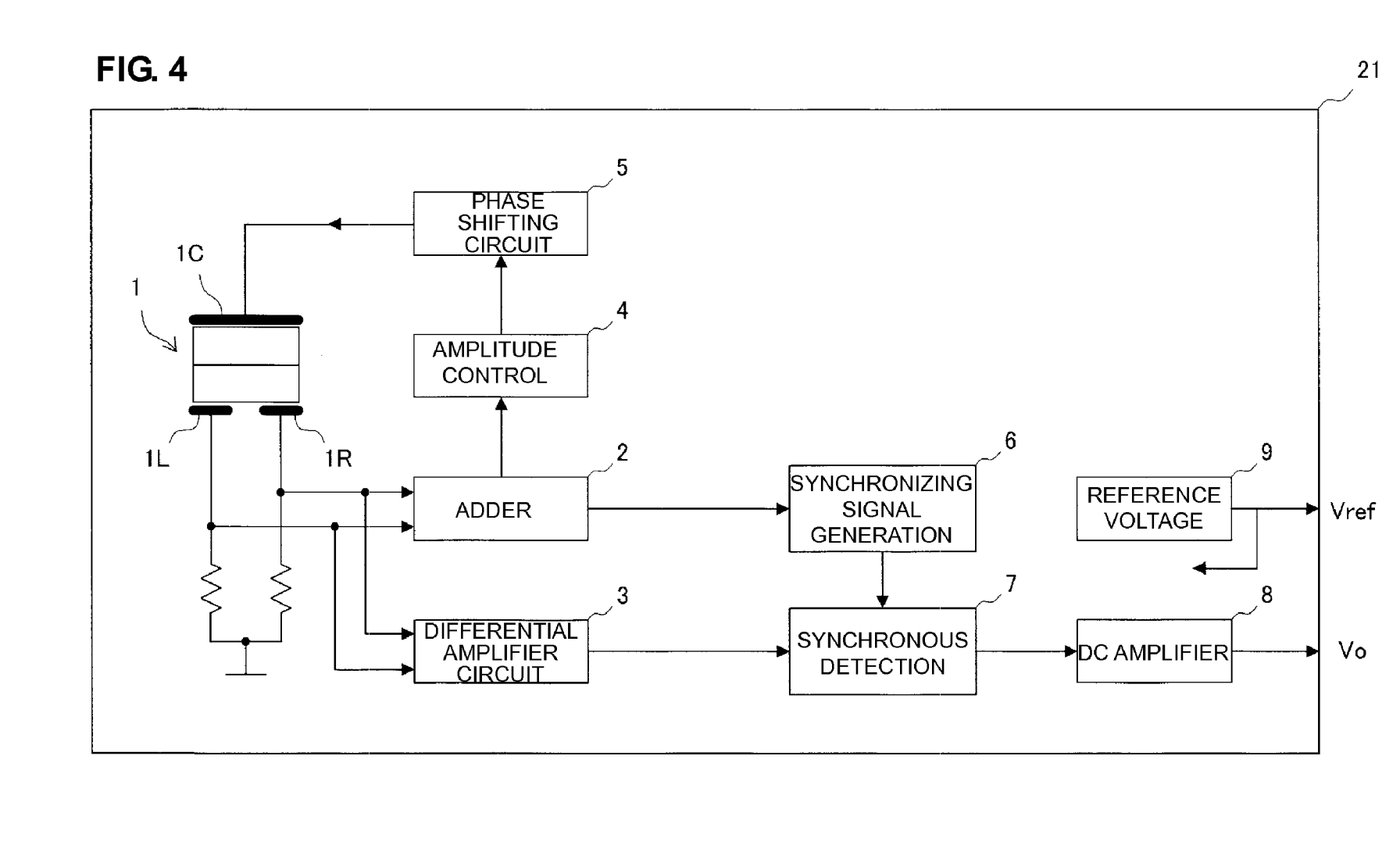
FIG. 4 is a block diagram illustrating a configuration of an angular velocity sensor included in the first preferred embodiment of the present invention.

FIG. 4 is a block diagram illustrating a configuration of the angular velocity sensor 21 shown in FIG. 3. In FIG. 4, a piezoelectric vibrator 1 includes a left electrode 1L, a right electrode 1R, and a common electrode 1C. The left electrode 1L and the right electrode 1R receive voltages +V through corresponding resistors. An L-signal including a Coriolis force and an R-signal including a Coriolis force are obtained from the left electrode 1L and the right electrode 1R, respectively, and each of the L-signal and the R-signal is supplied to an adder 2 and a differential amplifier circuit 3. The adder 2 adds the L-signal to the R-signal and outputs an L+R signal. Since the adder 2 adds the L-signal to the R-signal, the Coriolis forces are cancelled out and a stable returned signal is obtained.

The returned signal is supplied to an amplitude control circuit 4 to obtain a driving voltage having a constant amplitude. The driving voltage is supplied through a phase shifting circuit 5 to the common electrode 1C of the piezoelectric vibrator 1. The phase shifting circuit 5 is used to control a phase of the signal output from the adder 2 by setting a phase difference between the signal output from the adder 2 and the driving voltage to be supplied to the common electrode 1C so that oscillation is stably performed in a predetermined frequency. The piezoelectric vibrator 1, the adder 2, the amplitude control circuit 4, and the phase shifting circuit 5 define an oscillation circuit. The adder 2, the amplitude control circuit 4, and the phase shifting circuit 5 define a driving circuit that drives the piezoelectric vibrator 1.

The signal output from the adder 2 is also supplied to a synchronizing signal generation circuit 6 which is preferably defined by a comparator, for example, and which outputs a synchronizing signal having a rectangular waveform to be supplied to a synchronous detection circuit 7.

The synchronous detection circuit 7 detects a signal output from the differential amplifier circuit 3 in synchronization with the synchronizing signal output from the synchronizing signal generation circuit 6. A voltage output from the synchronous detection circuit 7 is a direct voltage which is proportional to an angular velocity applied to the piezoelectric vibrator 1 and which is supplied to a DC amplifier circuit 8. The DC amplifier circuit 8 performs DC amplifying processing of the supplied voltage and outputs the voltage as an angular velocity detection signal Vo. A reference voltage generation circuit 9 supplies a reference voltage Vref to the inside and the outside of the angular velocity sensor 21.

Referring to FIG. 3, the operation of the angular velocity sensor interface circuit 100 will be described.

When the angular velocity detection apparatus 200 is powered on, a control circuit 24 is reset and starts operating. The control circuit 24 controls a counter 25 to be maintained in a resetting state preferably for about 100 ms, for example, after the angular velocity detection apparatus 200 is activated. The control circuit 24 preferably waits about 100 ms, for example, for an output voltage of the angular velocity sensor 21 to become stable. Thereafter, the control circuit 24 supplies a clock signal output from a clock signal generation circuit 23 to the counter 25. Then, the counter 25 counts clock signals thus supplied from the control circuit 24 starting from an initial value of 0. A DA converter 26 supplies a voltage signal generated in accordance with a value of the counter 25 to a non-inversion input terminal (+) of an operational amplifier OP1. An input voltage of the non-inversion input terminal of the operational amplifier OP1 increases as the value of the counter 25 increases.

A comparator CP1 is used to compare a voltage output from the operational amplifier OP1 with the reference voltage Vref. When it is determined that the voltage output from the operational amplifier OP1 reaches the reference voltage Vref, the operational amplifier OP1 sets a control signal (a flag) to be supplied to the control circuit 24 (to a high-level state). Note that, in FIG. 3, triangle marks pointing downward represent lines of the reference voltage Vref. As a result, the control circuit 24 stops supplying the clock signal to the counter 25. In this state, the voltage output from the operational amplifier OP1 is substantially equal to the reference voltage Vref. In addition, since the flag is set, an offset control period is terminated.

In this offset control period after the angular velocity detection apparatus 200 is activated, a switch SW1 selects a reference voltage Vref side. Accordingly, the reference voltage Vref is supplied to the angular velocity signal processing circuit 101.

Since the reference voltage Vref is supplied to the angular velocity signal processing circuit 101 in the offset control period, the angular velocity signal processing circuit 101 outputs a voltage that is substantially the same as that obtained when an angular velocity has a value of 0 to an external host apparatus. Since when the angular velocity detection apparatus is activated, the angular velocity is usually not very large, a proper signal can be obtained even in the offset control period. Accordingly, the external host apparatus utilizes the signal output from the angular velocity detection apparatus without introducing errors even immediately after activation of the angular velocity detection apparatus.

The switch SW1 selects an ADJOUT voltage side which outputs an output voltage of the operational amplifier OP1 in accordance with setting a flag, that is, an output signal of the comparator CP1. Accordingly, after a lapse of the offset control time period, the angular velocity detection signal Vo output from the angular velocity sensor 21 is amplified so as to have a predetermined gain using the angular velocity detection signal amplifier circuit 30 and is further amplified (preferably about one hundred to about two hundred times, for example) to have a predetermined gain using an operational amplifier OP2 of the angular velocity signal processing circuit 101.

Figure 5:
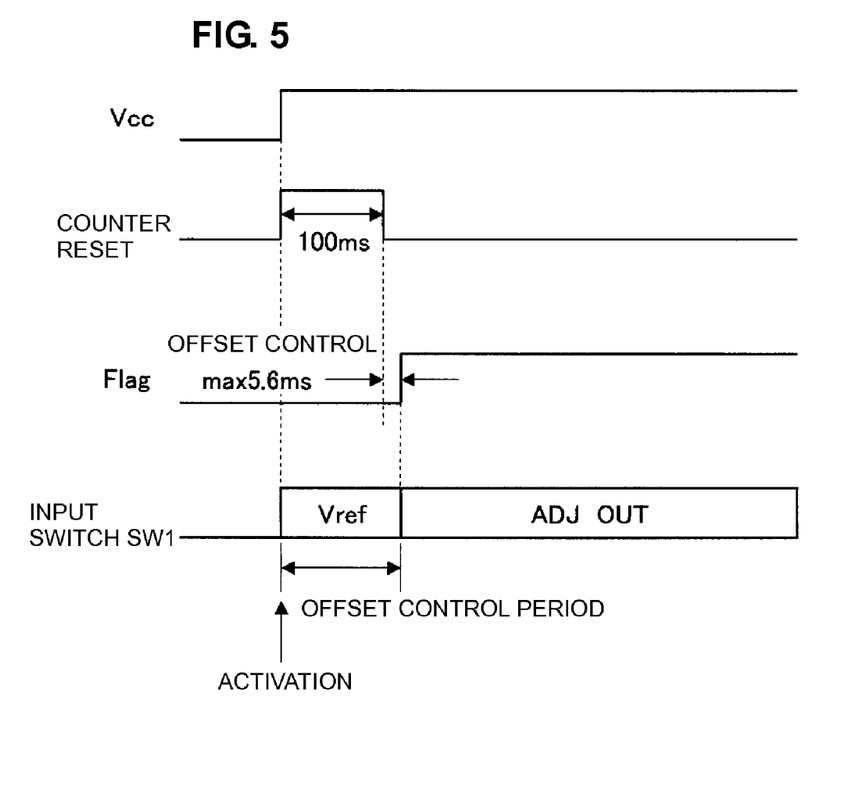
FIG. 5 is a timing chart illustrating a state of the angular velocity sensor interface circuit shown in FIG. 3 at an activation time.

FIG. 5 is a timing chart illustrating states of various sections shown in FIG. 3 after the angular velocity detection apparatus 200 is powered on. The control circuit 24 controls a counter 25 to be maintained in a resetting state preferably for about 100 ms, for example, after the angular velocity detection apparatus 200 is activated. The control circuit 24 preferably waits about 100 ms, for example, for an output voltage of the angular velocity sensor 21 to become stable.

After a lapse of about 100 ms, the control circuit 24 supplies a clock signal to the counter 25. In this manner, the flag is set by the operation described above by the time about 5.6 ms or less have elapsed, and the offset control processing is terminated. The time "about 5.6 ms" is obtained in accordance with a maximum count value of the counter 25 (a maximum input value of the DA converter 26) and a frequency of the clock signal.

Second Preferred Embodiment

An angular velocity sensor interface circuit and an angular velocity detection apparatus according to a second preferred embodiment of the present invention will now be described with reference to FIGS. 6 to 8.

Figure 6:
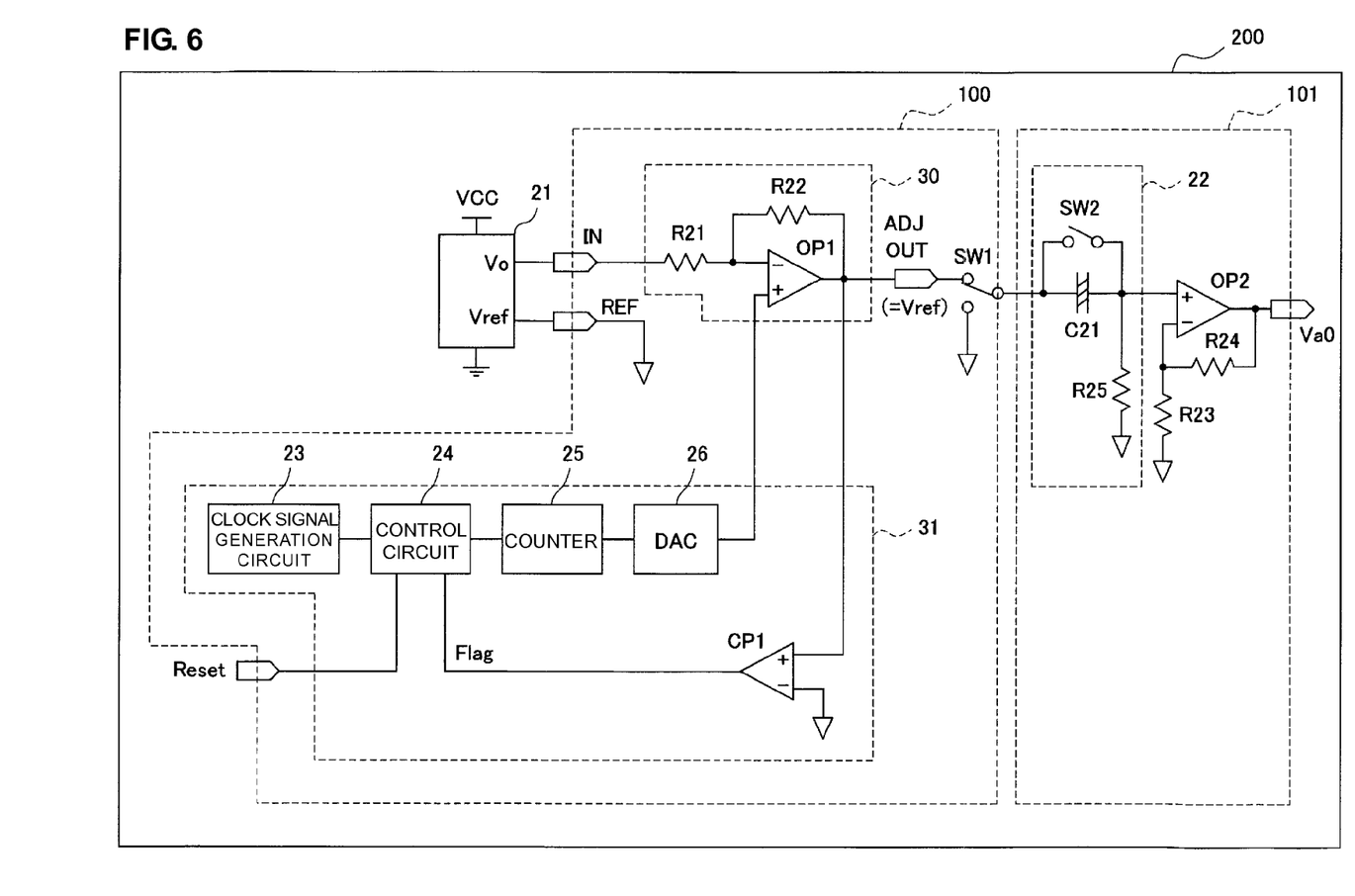
FIG. 6 is a block diagram illustrating a configuration of an angular velocity sensor interface circuit and an angular velocity detection apparatus according to a second preferred embodiment of the present invention.

FIG. 6 is a diagram illustrating a configuration of the angular velocity sensor interface circuit and the angular velocity detection apparatus according to the second preferred embodiment of the present invention. The configuration of the angular velocity sensor interface circuit and the angular velocity detection apparatus shown in FIG. 6 is different from the configuration of the angular velocity sensor interface circuit and the angular velocity detection apparatus shown in FIG. 3 in that a high-pass filter 22 including a capacitor C21 connected to an output terminal of the angular velocity detection signal amplifier circuit 30 in series and a shunt resistor R25 connected between the capacitor C21 and an reference voltage line is provided in an input section of the angular velocity signal processing circuit 101. In addition, a discharge switch circuit SW2 is connected between both terminals of the capacitor C21. The configuration and operation of remaining components are substantially the same as those shown in FIG. 3.

The discharge switch circuit SW2 is turned on in an offset control period. An input switch circuit SW1 selects a reference voltage Vref side in the offset control period. Accordingly, voltage biases applied to both terminals of a capacitor C21 and charge biases between the voltages are removed during the offset control period.

Figure 7:
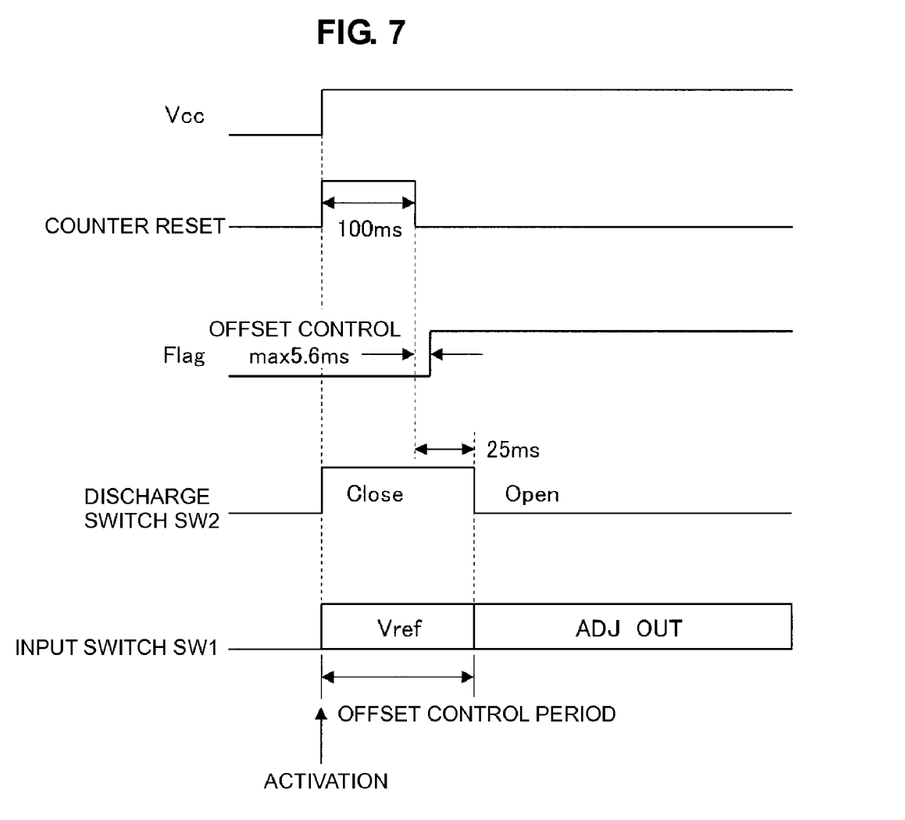
FIG. 7 is a timing chart illustrating a state of the angular velocity sensor interface circuit shown in FIG. 6 at an activation time.

FIG. 7 is a timing chart illustrating states of various sections shown in FIG. 6 after an angular velocity detection apparatus 200 is powered on. A control circuit 24 controls a counter 25 to be maintained in a resetting state preferably for about 100 ms, for example, after the angular velocity detection apparatus 200 is activated. The control circuit 24 preferably waits about 100 ms, for example, for an output voltage of an angular velocity sensor 21 to become stable.

After a lapse of about 100 ms, the control circuit 24 supplies a clock signal to the counter 25. In this manner, the flag is set by the operation described above by the time about 5.6 ms or less has elapsed, and the offset control processing is terminated. The discharge switch circuit SW2 is in an on-state preferably for about 125 ms, for example, after the angular velocity detection apparatus 200 is activated (for about 25 ms after the resetting state of the counter 25 is cancelled.) The input switch circuit SW1 selects a reference voltage Vref side. Accordingly, voltage biases applied to both terminals of a capacitor C21 and charge biases are removed.

FIGS. 8A to 8I are voltage waveform diagrams illustrating various patterns of a signal VaO output from the angular velocity detection apparatus 200 shown in FIG. 6 and various patterns of a signal output from the angular velocity detection apparatus prepared for comparison.

Figure 8A:
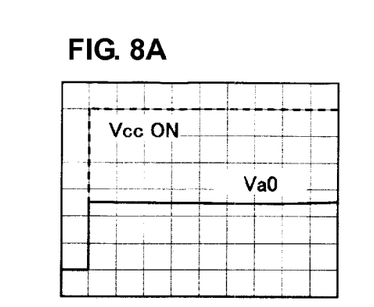
FIGS. 8A to 8I are voltage waveform diagrams illustrating various patterns of a signal VaO output from the angular velocity detection apparatus shown in FIG. 6 and various patterns of a signal output from the angular velocity detection apparatus prepared for comparison.
Figure 8B:
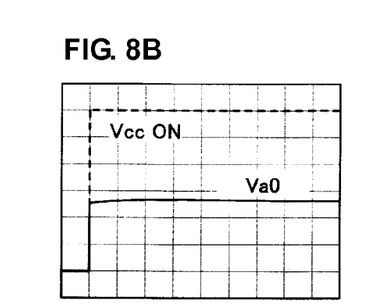
Figure 8C:
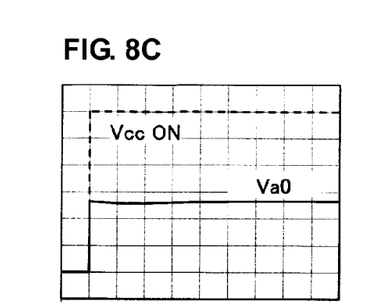

FIGS. 8A to 8C are waveforms of the signal VaO when the angular velocity detection apparatus 200 shown in FIG. 6 is activated. Note that, one scale of the axis of abscissa corresponds to one second.

The relationships between FIGS. 8A to 8I and the conditions of the angular velocity detection apparatus 200 are shown in the following Table 1.

TABLE 1

| | Vo = 1.146 [V]<br>Vref = 1.349 [V]<br>Voff = −204 [mV] | Vo = 1.321 [V]<br>Vref = 1.348 [V]<br>Voff = −27 [mV] | Vo = 1.547 [V]<br>Vref = 1.353 [V]<br>Voff = 195 [mV] |
|---|---|---|---|
| with an input switch and a discharge switch | (A) | (B) | (C) |
| with a high-speed charging switch | (D) | (E) | (F) |
| without switches | (G) | (H) | (I) |

Here, Voff denotes an offset voltage of the angular velocity sensor 21 and the operational amplifier OP1, that is, a voltage obtained in accordance with a difference between the voltage of the angular velocity detection signal Vo and the reference voltage Vref. Specifically, angular velocity sensors having an offset voltage of about −204 mV are used to obtain the waveform shown in each of FIGS. 8A, 8D, and 8G, angular velocity sensors having an offset voltage of about −27 mV are used to obtain the waveform shown in each of FIGS. 8B, 8E, and 8H, and angular velocity sensors having an offset voltage of about 195 mV are used to obtain the waveform shown in each of 8C, 8F, and 8I.

Figure 8D:
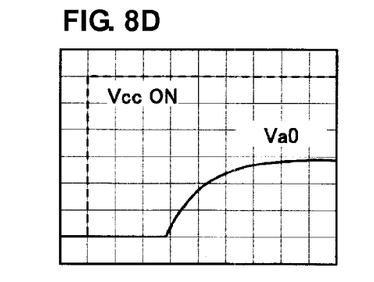
Figure 8E:
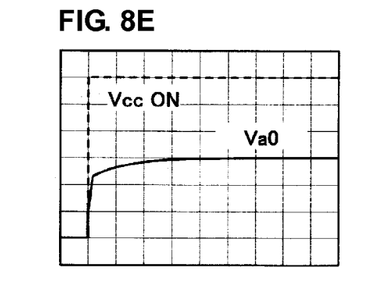
Figure 8F:
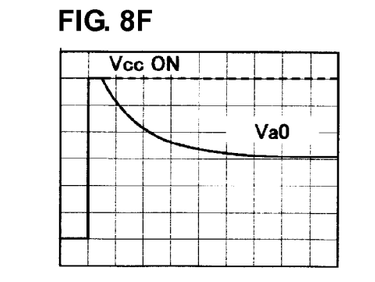
Figure 8G:
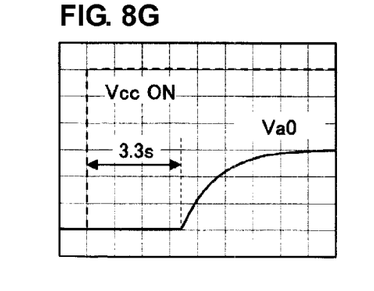

Furthermore, the waveforms shown in FIGS. 8A, 8B, and 8C are obtained when the input switch SW1 and the discharge switch circuit SW2 are arranged in the angular velocity detection apparatus 200 as shown in FIG. 6 and the angular velocity detection apparatus 200 is activated. The waveforms shown in FIGS. 8D, 8E, and 8F are obtained when a high-speed charging switch SW is arranged in the high-pass filter of the angular velocity sensor interface circuit in the related art, and the angular velocity sensor interface circuit is activated while the switch SW is turned on. The waveforms shown in FIGS. 8G, 8H, and 8I are obtained in a case where the angular velocity sensor interface circuit in the related art without a high-speed charging switch is activated.

As shown in FIGS. 8A, 8B, and 8C, even when absolute values of the offset voltages of the angular velocity sensor 21 and the operational amplifier OP1 are relatively large, a voltage of the signal VaO is stable even immediately after the angular velocity detection apparatus 200 is powered on.

Figure 8H:
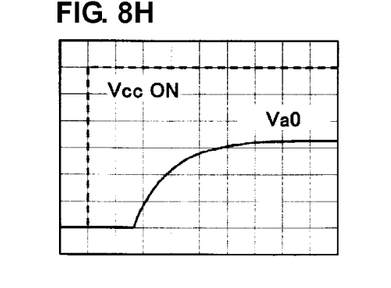
Figure 8I:
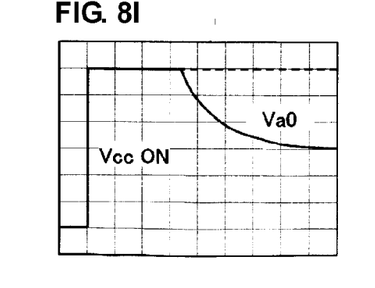

If the high-speed charging switch SW is not included in the angular velocity sensor interface circuit shown in FIG. 1, it takes a significant amount of time to activate the angular velocity detection apparatus even when the offset voltage of the operational amplifier is as small as about −27 mV as shown in FIG. 8H. Furthermore, as shown in FIGS. 8D, 8G, 8F, and 8I, when the offset voltage of the operational amplifier is relatively large, even when the high-speed charging switch SW is turned on when the angular velocity detection apparatus is powered on, the activation time is only slightly reduced.

Third Preferred Embodiment

An angular velocity sensor interface circuit and an angular velocity detection apparatus according to a third preferred embodiment of the present invention will now be described with reference to FIG. 9.

Figure 9:
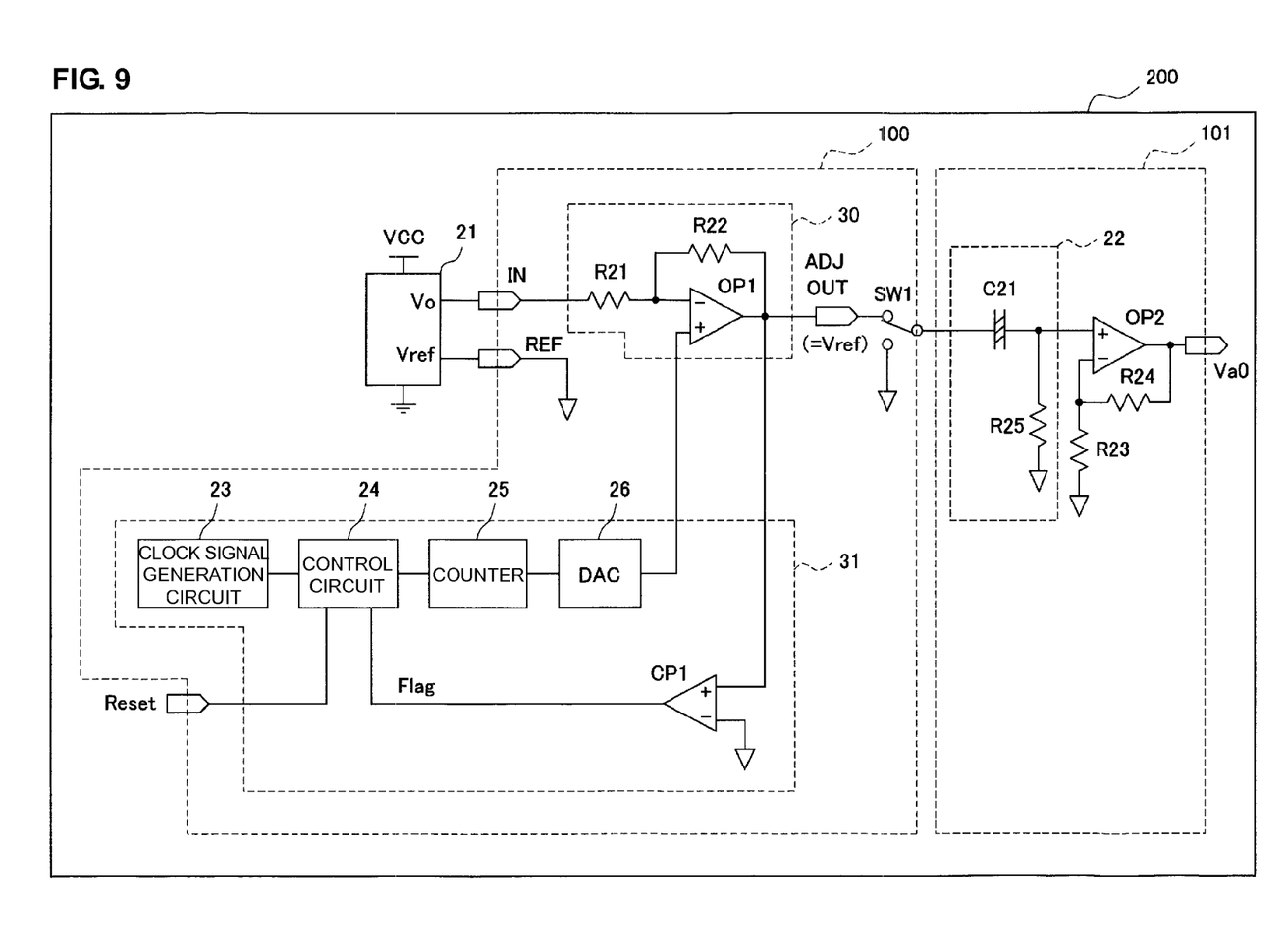
FIG. 9 is a block diagram illustrating a configuration of an angular velocity sensor interface circuit and an angular velocity detection apparatus according to a third preferred embodiment of the present invention.

The configuration of the angular velocity sensor interface circuit and the angular velocity detection apparatus shown in FIG. 9 is different from the configuration of the angular velocity sensor interface circuit and the angular velocity detection apparatus shown in FIG. 6 in that a high-pass filter 22 does not include a discharge switch circuit SW2. As shown in FIG. 9, even when the switch SW2 which causes a short circuit at both terminals of a capacitor C21 is not arranged in the high-pass filter 22, since a switch SW1 selects a reference voltage Vref side in an offset control period, a reference voltage Vref is supplied to the input switch circuit SW1 side of the capacitor C21. Furthermore, the reference voltage Vref is also supplied through a resistor R25 to an operational amplifier OP2 side of the capacitor C21. Accordingly, if it is determined that the capacitor C21 has not been charged immediately after an angular velocity detection apparatus 200 is powered on, a charge/discharge current is not supplied to the capacitor C21. Therefore, the capacitor C21 is usually not charged/discharged in the offset control period, and accordingly, it does not take a long time to activate the angular velocity detection apparatus 200.

Fourth Preferred Embodiment

Figure 10:
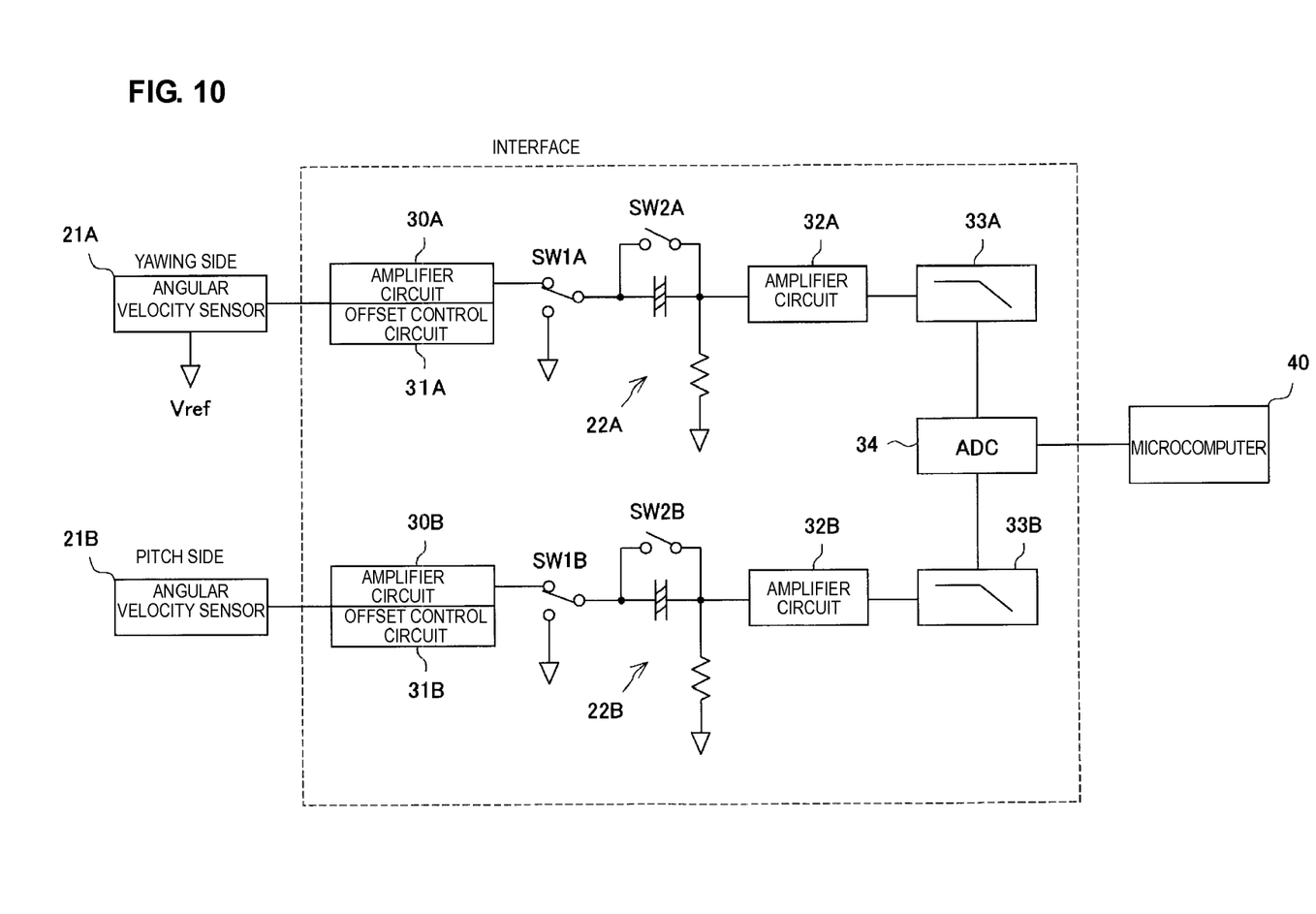
FIG. 10 is a block diagram illustrating configurations of an angular velocity sensor interface circuit and an angular velocity detection apparatus according to a fourth preferred embodiment of the present invention.

FIG. 10 is a block diagram illustrating a configuration of an angular velocity sensor interface circuit and an angular velocity detection apparatus according to a fourth preferred embodiment of the present invention. The configuration of an angular velocity sensor 21, an angular velocity detection signal amplifier circuit 30, an offset control circuit 31, an input switch circuit SW1, and a high-pass filter 22 is substantially the same as that shown in FIG. 6. An amplifier circuit 32 amplifies a signal output from the high-pass filter 22. A low-pass filter 33 eliminates an unnecessary signal component which has a frequency substantially equal to or greater than that of a predetermined frequency.

In the fourth preferred embodiment of the present invention, first and second systems are provided. The first system includes an angular velocity sensor 21A, an angular velocity detection signal amplifier circuit 30A, an offset control circuit 31A, an input switch circuit SW1A, an discharge switch circuit SW2A, a high-pass filter 22A, an amplifier circuit 32A, and a low-pass filter 33A. The second system includes an angular velocity sensor 21B, an angular velocity detection signal amplifier circuit 30B, an offset control circuit 31B, an input switch circuit SW1B, an discharge switch circuit SW2B, a high-pass filter 22B, an amplifier circuit 32B, and a low-pass filter 33B.

An AD converter 34 selects one of the signals output from the low-pass filters 33A and 33B in a time division manner and converts the selected signal into digital data. A microcomputer 40 controls the AD converter 34 to select a signal and reads a value of the digital data which has been subjected to AC conversion using the AD converter 34 to perform camera shake compensation processing, for example.

The angular velocity sensor 21A is preferably arranged in a camera to detect angular velocity in a yawing direction, that is, angular velocity having a vertical line as a rotation axis. The angular velocity sensor 21B is preferably arranged in a camera so as to detect angular velocity in a pitching direction, that is, angular velocity having a horizontal line as a rotation axis. Accordingly, two angular velocity sensors can be used without increasing the circuit size.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An angular velocity sensor interface circuit comprising:
   a piezoelectric vibrator;
   a circuit arranged to drive the piezoelectric vibrator and to detect a voltage generated by vibration of the piezoelectric vibrator, and to output an angular velocity detection signal which is a voltage signal generated in accordance with an applied angular velocity to an angular velocity signal processing circuit;
   an angular velocity detection signal amplifier circuit arranged to amplify the angular velocity detection signal;
   an offset control circuit arranged to control an offset of the angular velocity detection signal amplifier circuit so that an output voltage of the angular velocity detection signal amplifier circuit is substantially equal to a reference voltage which is substantially equal to an output voltage when a value of the applied angular velocity is 0 in an offset control period after the angular velocity sensor interface circuit is activated; and
   an input switch circuit arranged to supply the reference voltage to the angular velocity signal processing circuit in the offset control period and to supply a signal output from the angular velocity detection signal amplifier circuit to the angular velocity signal processing circuit after the offset control period is terminated; wherein
   the input switch circuit is arranged between the angular velocity detection signal amplifier circuit and the angular velocity signal processing unit so as to be directly connected to the angular velocity detection signal amplifier circuit and to the angular velocity signal processing unit.

2. The angular velocity sensor interface circuit according to claim 1, further comprising:
   a high-pass filter provided in an input section of the angular velocity signal processing circuit and including a capacitor connected to an output terminal of the angular velocity detection signal amplifier circuit in series and a shunt resistor connected between the capacitor and a line of the reference voltage.

3. The angular velocity sensor interface circuit according to claim 2, further comprising:
   a discharge switch circuit arranged to cause a short circuit at both terminals of the capacitor in the offset control period and to release both terminals of the capacitor after the offset control period is terminated.

4. The angular velocity sensor interface circuit according to claim 1, wherein
   the angular velocity signal processing circuit includes an amplifier circuit arranged to amplify a voltage output from the angular velocity detection signal amplifier circuit and a filter which attenuates a signal component in an unnecessary frequency band, and outputs a voltage signal generated in accordance with the applied angular velocity; and the angular velocity sensor interface circuit includes two angular velocity signal processing circuits and an AD converter arranged to alternately perform AD conversion of voltage signals output from the two angular velocity signal processing circuits in a time division manner and to externally output the converted signals.

5. An angular velocity detection apparatus comprising:
the angular velocity sensor interface circuit set forth in claim 1; and
an angular velocity sensor.

6. An angular velocity detection apparatus, comprising:
the angular velocity sensor interface circuit set forth in claim 4; and
first and second angular velocity sensors arranged such that a rotation axis of an angular velocity to be detected using the first angular velocity sensor is substantially perpendicular to a rotation axis of an angular velocity to be detected using the second angular velocity sensor, and which are arranged to supply angular velocity detection signals to the two corresponding angular velocity signal processing circuits.

* * * * *